Jan. 31, 1961    R. B. EDELMANN    2,969,679
ANTI-FREEZE TESTER
Filed Dec. 15, 1958
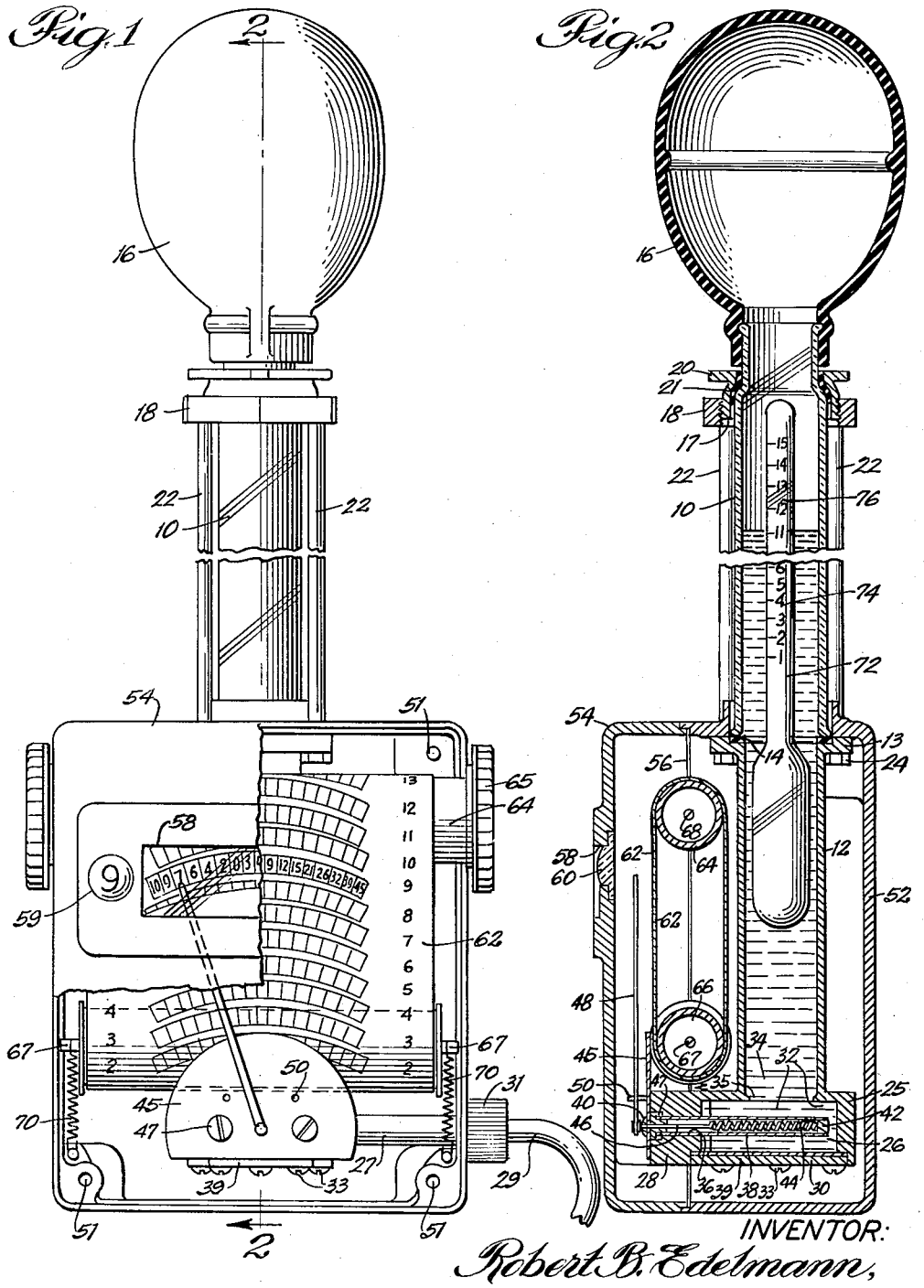
INVENTOR:
Robert B. Edelmann,
BY Bair, Freeman & Molinare
ATTORNEYS.

United States Patent Office 2,969,679
Patented Jan. 31, 1961

2,969,679
ANTI-FREEZE TESTER

Robert B. Edelmann, Chicago, Ill., assignor to E. Edelmann and Company, Chicago, Ill., a corporation of Illinois Filed Dec. 15, 1958, Ser. No. 780,383

2 Claims. (Cl. 73—443)

This invention relates to a hydrometer which permits a direct reading of the temperature at which an antifreeze solution will freeze compensated for the temperature of the solution. The freezing temperature of such a solution is proportional to the specific gravity of the solution. Since the specific gravity of a solution varies with the temperature it is essential for accuracy that the temperature be taken into consideration when measuring the specific gravity. For example, in checking the radiator of an engine that has been running for some time the specific gravity of the anti-freeze solution in the radiator will be lower than when the measurement is taken before the engine has run. Consequently, it is necessary in order to obtain accurate readings to incorporate thermometric means in the hydrometer.

It is the primary object of the present invention to provide a hydrometer which will give a direct reading of the temperature at which the test solution will freeze, which reading automatically compensates for the temperature of the test liquid. Heretofore, it was necessary to take a reading on a thermometer and then pick a value corresponding to the thermometer reading from a chart.

Another object of the invention is to provide a simple, inexpensive, reliable hydrometer which may be read to obtain the correct freezing value for an anti-freeze solution without confusion on the part of the operator.

In a preferred form of the invention a bimetal coil is disposed in the bottom of the barrel in which the test liquid is placed for making the specific gravity determination. An indicator needle is attached to the end of the bimetal coil and cooperates with a graduated scale to give a direct corrected freezing reading for any temperature over the range in which the device is intended to operate. A plurality of graduated scales are printed on a movable web, one for each specific gravity reading on the hydrometer float.

Other objects and advantages of the invention will be apparent from the following detailed description setting forth an illustrative form of the invention when read in conjunction with the accompanying drawings, wherein:

Figure 1 is a front elevational view of a hydrometer constructed in accordance with the invention with part of the front cover plate broken away; and Figure 2 is a sectional view taken along the line 2—2 of Figure 1.

The transparent portion of the main barrel is identified by the numeral 10 and consists of a glass tube which is of slightly smaller diameter at the top. A collapsible bulb 16 made from rubber or similar elastic material is attached to the top of the tube and embraces a bead projecting from the top edge of the barrel 10. The lower portion 12 of the barrel is a die casting and is secured in abutting relation with the glass portion 10 by means of tie rods 22 which extend from a ring 17 secured to the top portion of the barrel 10 by means of a nut 18 screwed onto the lower end of retainer yoke 20. The yoke rests on a gasket member 21 to prevent cracking the glass. The lower ends of the tie rods 22 extend through the top wall of the housing 52 and through the flange 13 comprising an integral part of the lower portion 12 of the barrel. A gasket 14 seated on the end of the molded portion 12 forms a sealing cushion for the lower end of the glass barrel 10. Nuts 24 screwed on the ends of the tie rods 22 pull the glass and plastic portions of the barrel into a compression seal against gasket 14 and simultaneously lock the barrel 12 to the housing 52 to provide a unitary assembly. The assembled barrel houses a standard weighted float 72. A bumper 34 for the float rests on the spider 35 at the bottom of barrel 12.

The lower end of the lower barrel portion 12 opens into an integrally molded chamber 26 having a tube 27 connected thereto through wall 25. The tube 27 connects at its other end to a flexible filler tube 29 by means of a fitting 31 at the side wall of housing 52. Test solution is sucked into the barrel through tube 29 by squeezing bulb 16. Molded integrally with the chamber are a series of circumferential bosses 32 which are internally threaded to receive screws 33 for securing a cover plate 39 to the open underside of the chamber 26. The wall 25 of the chamber forms a projection toward the front as indicated at 28 and contains a bore 36 through which metal tube or sleeve 38 extends into the chamber. The sleeve 38 is formed integrally with the bushing 40 and the arcuate plate 45. Disposed within the tube 38 is a bimetal coil 44 of well known construction having one end secured to a plug 42 in the end of tube 38. A shaft 46 connects to the other end of the bimetal coil and is supported by bushing 40. An O-ring 47 surrounding the sleeve 38 seals the interior of the chamber 26 and the barrel from the outside.

Mounted on the end of the shaft 46 is an indicator hand 48 which moves through an arcuate path in response to temperature changes within the tube due to the torque imposed on the bimetal coil. The indicator hand cooperates with any one of a series of vertically disposed scales printed on a vertically movable web 62 which may be made from paper, linen, plastic or other suitable flexible material. The web 62 may take the form of an endless belt trained over a pair of rollers 64, 66 which are mounted on shafts 68 and 67, respectively. The lower roller 66 is held in tension by means of coil springs 70 which are secured at one end to the shaft 67 and at the other end to the housing. The upper roller is journalled in the housing and has a knurled knob 65 connected to either end to facilitate turning the web. All of the elements comprising the lower portion of the instrument, that is, the portion beneath the transparent barrel 10, are enclosed within the housing 52. The housing 52 has a separable front cover 54 which joins the housing proper along the line 56 and is secured thereto by screws (not shown) which screw into threaded openings 51 at each corner. A slot or opening 58 is provided in the cover 54 to permit viewing the series of vertically disposed scales printed on the web 62. Preferably, the opening 58 carries a lens 60 for magnifying the indicia on the web. It will be appreciated that by turning the knob 65 the vertically disposed scales can be brought into view one at a time by alignment with the opening 58. The upper end of the indicator hand 48 is also visible through the opening 58. Separate smaller openings 59 adjacent either end of the opening 58 are provided to make visible characters printed along the margins of the web to identify each of the scales printed thereon. In the drawing it will be noted that the scales which are visible are numbered from 2 to 13 reading from the bottom to the top. The scale visible through the opening 58 is identified as No. 9 and this is readily apparent by looking through the opening 59 where the numeral 9 very clearly appears.

The opening 59 also may contain a magnifying lens.

Arcuate plate 45 attached to bushing 40 is connected to the front of the projection 28 by means of screws 47 and carries a pair of pins 50 which limit the distance through which the indicator hand may move.

The standard weighted float 72 within the barrel carries two scales 74, 76. The scale 74 is suitable for liquids having a specific gravity less than water and the scale 76 is suitable for liquids having a specific gravity greater than water. The characters comprising the scale 74 and 76 are indicative of specific gravity and correspond to the characters printed along the margins of the web 62.

In operating the instrument a sample of the antifreeze liquid to be tested is sucked into the barrel through the tube 29. The float 72 rises due to the buoyant effect of the liquid and a reading is taken on either scale 74 or 76, according to the density of the particular solution being tested. The reading taken from either scale 74 or 76 corresponds to one of the figures on the margin of the web. The knurled knob 65 is turned until the character corresponding to the reading appears through the opening or window 59. The indicator hand 48 indicates the temperature at which the liquid in the barrel will freeze and this reading is accurate regardless of the temperature of the test liquid since the indicator hand compensates for the temperature due to the torque produced by the bimetallic coil 44. The numerals on each scale are designed to cooperate with the position of the indicator 48 to give the correct reading for the temperature of the solution in the chamber 26.

Various modifications in the construction of my apparatus will occur to those skilled in the art. It is my intention to cover in the appended claims any modifications or mechanical equivalents that might reasonably be included within their scope.

What I claim as new and desire to secure by Letters Patent of the United States is:

1. A hydrometer comprising an elongated, upright barrel terminating at its upper end in a collapsible bulb and at its lower end in a temperature-measuring chamber, a tube connecting to said chamber for carrying liquid into and out of said barrel, a float member disposed within said upright barrel and carrying specific gravity characters thereon, a temperature-sensitive bimetal coil mounted in said chamber and having a laterally extending shaft extending therefrom through the wall of said chamber, the axis of said shaft being transverse to the longitudinal axis of said barrel, an upright indicator hand connected to the end of said shaft for arcuate movement about the axis of said shaft in response to changes in temperature in the liquid within said chamber, a vertically movable web mounted between said upright indicator hand and said upright barrel and having a series of vertically-disposed scales printed thereon, each scale corresponding to a specific gravity character on said float in said upright barrel, a housing enclosing said chamber, indicator and web, and a slot in said housing opposite said web through which one scale at a time of said web is visible together with said upright indicator hand.

2. A hydrometer comprising an elongated, upright barrel terminating at its upper end in a collapsible bulb and at its lower end in a laterally enlarged chamber, a tube connecting to said chamber for carrying liquid into and out of said barrel, a float member disposed within said upright barrel and carrying specific gravity characters thereon, an elongated thermally-conductive sleeve projecting laterally into said chamber through the wall thereof and closed at its inner end, a temperature-sensitive bimetal coil mounted in said sleeve and secured to said inner end, said coil having a shaft extending laterally outside said chamber, the axis of said shaft being transverse to the longitudinal axis of said barrel, an upright indicator hand connected to the end of said shaft for arcuate movement about the axis of said shaft in response to changes in temperature in the liquid within said chamber, a vertically movable web mounted between said upright indicator hand and said upright barrel and having a series of vertically-disposed scales printed thereon, each scale corresponding to and identified by a specific gravity character on said float in said upright barrel, a housing enclosing said chamber, indicator and web, and a slot in said housing opposite said web through which one scale at a time of said web is visible together with the upright end of said indicator hand.

References Cited in the file of this patent

UNITED STATES PATENTS

| | | |
|---|---|---|
| 1,420,038 | Hebrock | June 20, 1922 |
| 1,692,551 | Harris | Nov. 20, 1928 |
| 2,276,872 | Quinn | Mar. 17, 1942 |
| 2,288,560 | Webber | June 30, 1942 |
| 2,292,680 | Webber | Aug. 11, 1942 |
| 2,331,542 | Edelmann | Oct. 12, 1943 |
| 2,704,450 | Edelmann | Mar. 22, 1955 |